April 15, 1930.  H. H. SCHOTT  1,754,486
WAFFLE IRON
Filed July 1, 1929  2 Sheets-Sheet 1
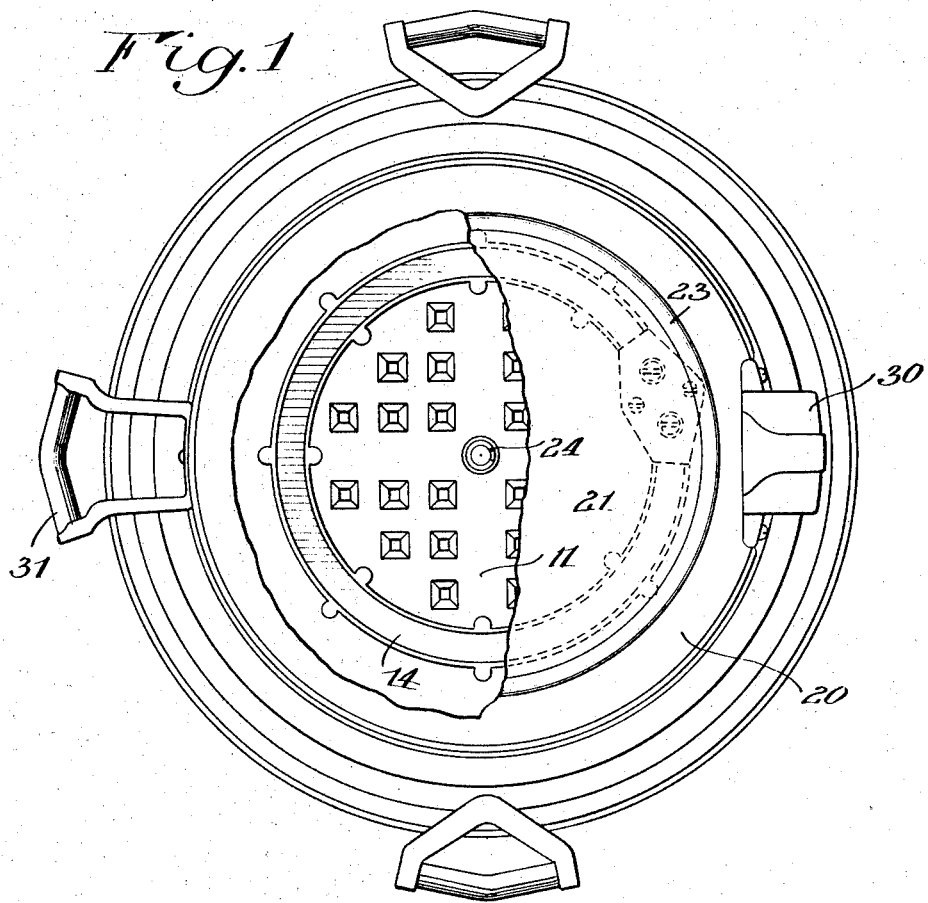
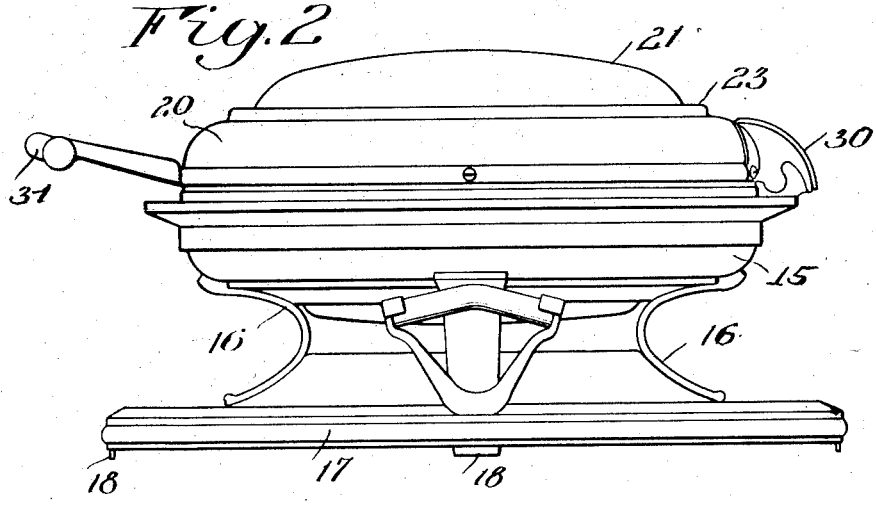
INVENTOR
Howard H. Schott
BY
Cumpton + Griffith
his ATTORNEYS April 15, 1930.   H. H. SCHOTT   1,754,486
WAFFLE IRON
Filed July 1, 1929   2 Sheets-Sheet 2
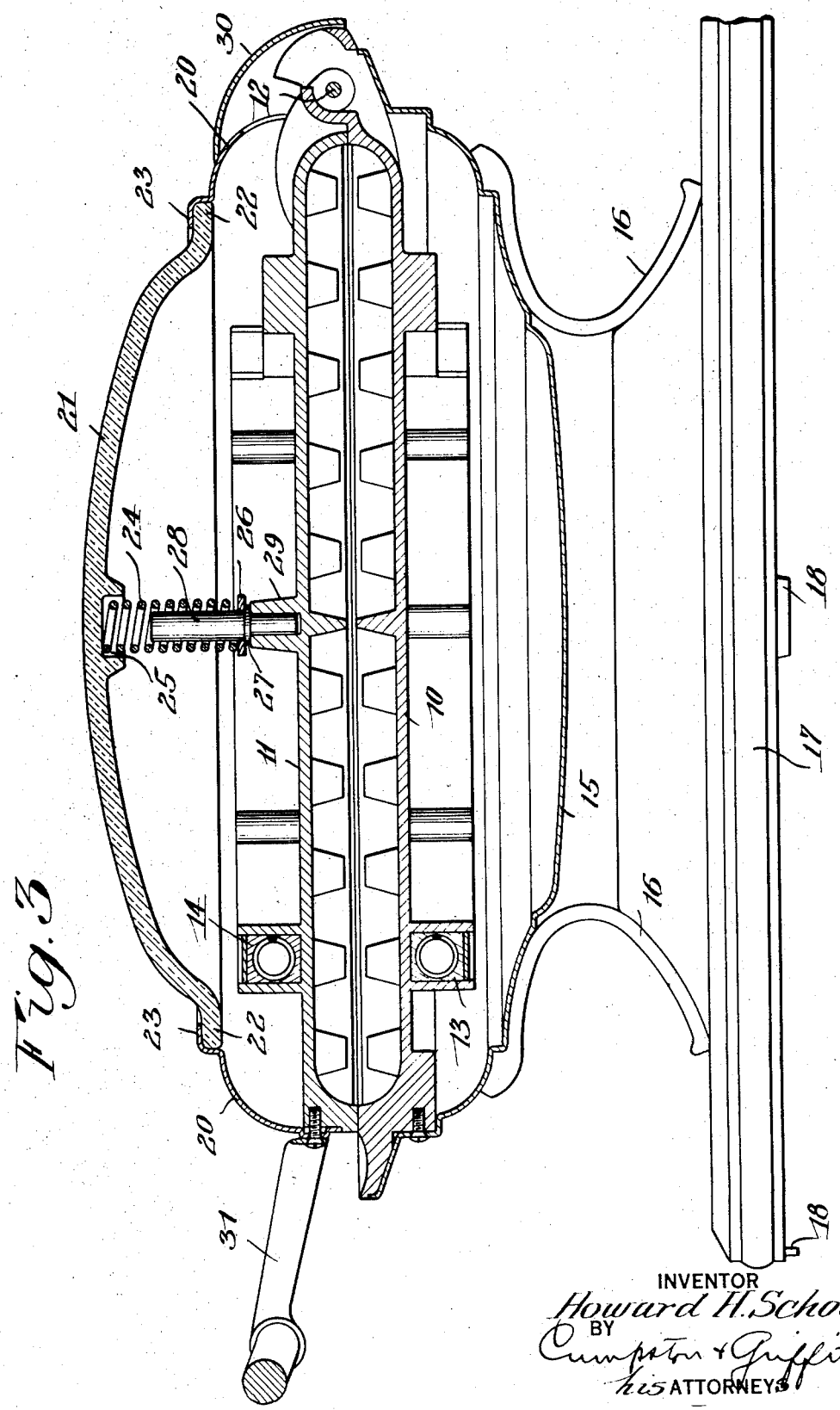
INVENTOR
Howard H. Schott
BY
Cumpston & Griffith
his ATTORNEYS Patented Apr. 15, 1930

1,754,486

UNITED STATES PATENT OFFICE

HOWARD H. SCHOTT, OF ROCHESTER, NEW YORK, ASSIGNOR TO ROBESON-ROCHESTER CORPORATION, OF ROCHESTER, NEW YORK, A CORPORATION OF NEW YORK

WAFFLE IRON

Application filed July 1, 1929. Serial No. 374,984.

This invention relates to a waffle iron, and especially to the type of waffle iron heated by an electric heating unit. In such irons, there is frequently such loss of heat by radiation, conduction, or dispersion from the upper grid that this grid is cooler than the lower grid, and accordingly the waffle is not uniformly cooked on both sides. An object of the invention is the provision of a generally improved, more satisfactory, and more efficient waffle iron, with special reference to conservation of heat so that less heat will be required to maintain the iron at the proper temperature, and especially so that the heat losses from the upper grid will be substantially reduced, thus keeping the upper grid at substantially the same temperature as the lower grid, and permitting the waffle to be cooked uniformly on both sides.

Another object is the provision of a waffle iron having heat conservation features, which is comparatively simple and easy to construct, and rugged and durable in use.

Another object of the invention is the provision, in a waffle iron having a portion of ceramic or other relatively fragile material, of satisfactory means for mounting the fragile portion in such a way as to reduce the danger of breakage thereof.

To these and other ends the invention resides in certain improvements and combinations of parts, all as will be hereinafter more fully described, the novel features being pointed out in the claims at the end of the specification.

In the drawings:

Fig. 1 is a plan view of a waffle iron constructed in accordance with a preferred embodiment of the invention, with parts broken away;

Fig. 2 is a side elevation thereof, and

Fig. 3 is a longitudinal vertical section taken substantially through the center of the waffle iron.

Similar reference numerals throughout the several views indicate the same parts.

Referring now to the drawings, and especially to Fig. 3 thereof, the waffle iron comprises the usual lower grid 10 and upper grid 11 connected to each other by a hinge, the pivot of which is indicated at 12. The lower grid is heated by any suitable electric heating unit such as the annular unit 13, while the upper grid is heated by any suitable electric heating unit which may likewise be an annular unit 14.

A casing 15 covers the lower heating unit 13 and supports the lower grid, this casing being supported in turn by legs or standards 16 which rest upon a base 17 provided with feet 18 of heat insulating material.

A casing is likewise provided over the upper grid 11, and covering the heating unit 14. According to the present invention, a substantial portion and preferably the major portion of this casing is constructed of material having relatively low heat conductivity. For example, this upper casing may comprise an annular metallic rim 20 extending around the periphery of the upper grid, as shown in Figs. 1 and 3, and a central portion 21 of non-metallic material having relatively low heat conductivity. It has been found in use that this portion 21 may be constructed satisfactorily of heat resisting porcelain or china, or other suitable ceramic material. The term "ceramic" as used here and in the claims is intended to include not only porcelain, china, and earthen ware or clay products of various kinds, but also glass and similar vitreous products.

It is found in practice that when a substantial portion of the casing over the upper grid is constructed of ceramic material or other material having relatively low heat conductivity, this construction reduces the heat losses from the upper grid to such an extent that this grid is maintained at substantially the same temperature as the lower grid, thus enabling the production of a waffle which is uniformly cooked on both sides, and also conserving heat and electric current used to produce heat. Also, when this construction is used, it is found that the asbestos or other heat insulating filling frequently employed in prior constructions between the heating element and the casing may be omitted, thus resulting in a simpler construction which is easier and less expensive to build, and less liable to get out of order. Furthermore, the use of ceramic or similar material for a portion of the casing results in a construction which is of more pleasing appearance than the prior casings constructed entirely of metal, and which lends itself readily to decoration or ornamentation.

In order to reduce to a minimum the possibility of breaking the non-metallic portion of the casing, it is advantageous to mount this portion resiliently. As shown in Fig. 3, the periphery 22 of the portion 21 underlies an annular flange 23 on the metallic rim 20. Resilient means such as the coiled spring 24 presses upwardly against the portion 21 substantially at the center thereof, and thus keeps the periphery 22 in engagement with the flange 23. The upper end of the spring 24 is received in a cavity or pocket 25 formed in the member 21, while the lower end of the spring presses against a washer 26 resting upon a shoulder 27 of a pin 28 the lower end of which fits into a hole in a boss 29 formed centrally on the back of the upper grid 11. This pin 28 extends into the spring 24 through a substantial part of the length thereof and thus acts as a guide preventing lateral displacement of the spring.

With this resilient mounting, the member 21 is permitted to yield slightly relative to the rim 20 in response to expansion or contraction caused by temperature changes. This prevents the possibility of breakage of the portion 21, which might occur if it were rigidly fixed to the rim 20, on account of the different coefficients of expansion of the rim and the portion 21. This resilient mounting is also advantageous in permitting the portion 21 to yield slightly when accidental blows fall upon it, thus lessening the likelihood of breakage from such blows.

A hood shaped hinge cover 30 may be attached to the metallic rim 20 in position to cover the parts of the hinge and hide the electric wires which preferably lead around the hinge to the space between the upper grid and its casing, to provide electric current to the heating element 14.

A handle 31 may be attached to the upper grid at a point opposite the hinge, which handle may be conveniently grasped when it is desired to open the waffle iron to insert batter or to remove a cooked waffle.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. In a waffle iron, the combination with upper and lower grids, of a casing above the upper grid, a casing below the lower grid, and an electric heating element within each casing for heating the associated grid, said upper casing having a substantial portion thereof constructed of ceramic material and said lower casing being constructed substantially entirely of material having higher heat conductivity than that of said ceramic material.

2. In a waffle iron, the combination with a grid, of an electric heating element for heating said grid, and a casing covering said heating element, said casing having a major portion thereof constructed of ceramic material spaced from said grid and heating element to provide an air space of substantial extent between said ceramic material and said grid and heating element.

3. In a waffle iron, the combination with a grid, of a heating element for heating said grid, and a casing covering said heating element, said casing having a metallic rim having an edge spaced a substantial distance from said grid and heating element and a central portion of non-metallic material spaced from said grid and heating element to provide an air space between said central portion and said grid and heating element, and means for holding said central non-metallic portion in contact with said edge of said rim so that the position of said edge of said rim determines the position of said central portion in a direction perpendicular to said grid.

4. In a waffle iron, the combination with a grid, of a heating element for heating said grid, and a casing covering said heating element, said casing having a metallic rim having an edge spaced a substantial distance from said grid and heating element and a central portion of ceramic material spaced from said grid and heating element to provide an air space between said central portion and said grid and heating element, and means for holding said central ceramic portion in contact with said edge of said rim so that the position of said edge of said rim determines the position of said central portion in a direction perpendicular to said grid.

5. In a waffle iron, the combination with a grid, of a heating element for heating said grid, a casing covering said heating element, said casing having a substantial portion constructed of material having relatively low heat conductivity, and resilient means for holding said portion in position.

6. In a waffle iron, the combination with a grid, of a heating element for heating said grid, a casing covering said heating element, said casing having a substantial portion constructed of non-metallic material, and resilient means for holding said portion in position.

7. In a waffle iron, the combination with a grid, of a heating element for heating said grid, a casing covering said heating element, said casing having a substantial portion constructed of ceramic material, and resilient means for holding said portion in position.

8. In a waffle iron, the combination with a grid, of a heating element for heating said grid, a casing covering said heating element, said casing having a metallic rim and a central portion of ceramic material, and resilient means for holding said central portion in position.

9. In a waffle iron, the combination with a grid, of a heating element for heating said grid, a casing covering said heating element, said casing having a metallic rim and a central portion of ceramic material having its periphery engaging said metallic rim, and resilient means for holding said central portion against said rim.

10. In a waffle iron, the combination with a grid, of a heating element for heating said grid, a casing covering said heating element, said casing having an annular metallic rim and a central portion of ceramic material with its periphery engaging the under side of said annular rim, and resilient means pressing outwardly against said ceramic portion substantially at the center thereof, to hold the periphery thereof in engagement with said rim.

11. In a waffle iron, the combination with a grid, of a heating element for heating said grid, a casing covering said heating element, and a coiled spring within said casing tending to press a portion of the latter in a direction away from said grid.

12. In a waffle iron, the combination with a grid, of a heating element for heating said grid, a casing covering said heating element, said casing having a metallic rim and a central portion of ceramic material having its periphery engaging said rim, and a coiled spring within said casing pressing outwardly upon said central ceramic portion to hold the latter in engagement with said rim.

13. In a waffle iron, the combination with a grid, of a heating element for heating said grid, a casing covering said heating element, said casing having a metallic rim and a central portion of ceramic material having its periphery engaging said rim, a coiled spring within said casing pressing outwardly upon said central ceramic portion to hold the latter in engagement with said rim, and a pin mounted on said grid extending through a portion of said coiled spring to maintain said spring in proper position.

14. In a waffle iron, the combination with a grid, of a heating element for heating said grid, a casing covering said heating element, said casing having a metallic rim and a central portion of ceramic material having its periphery engaging said rim, said central ceramic portion having a recess in its inner surface, and a coiled spring within said casing pressing outwardly upon said central ceramic portion to hold the latter in engagement with said rim, one end of said spring being seated in said recess to maintain said spring in proper position.

15. In a waffle iron, the combination with a grid, of a heating element for heating said grid, a casing covering said heating element, said casing having a metallic rim and a central portion of ceramic material having its periphery engaging said rim, said central ceramic portion having a recess in its inner surface, a pin mounted on said grid, and a coiled spring within said casing pressing outwardly upon said central ceramic portion to hold the latter in engagement with said rim, one end of said spring surrounding said pin and the opposite end of said spring being seated in said recess to maintain said spring in proper position.

HOWARD H. SCHOTT.